United States Patent
Justen et al.

(10) Patent No.: US 8,127,176 B2
(45) Date of Patent: Feb. 28, 2012

(54) TR-069 SAVEPOINTS

(75) Inventors: Pascal Marie Edouard Julien Justen, Sint-Pieters-Woluwe (BE); Christoph Stevens, Stekene (BE); Werner Mario Liekens, Sint Katelijne Waver (BE); Jan Coppens, Gent (BE); Willem Jozef Amaat Acke, Rijmenam (BE)

(73) Assignee: Alcatel Lucent, Paris (FR)

( * ) Notice: Subject to any disclaimer, the term of this patent is extended or adjusted under 35 U.S.C. 154(b) by 278 days.

(21) Appl. No.: 12/458,137

(22) Filed: Jul. 1, 2009

(65) Prior Publication Data

US 2010/0023806 A1    Jan. 28, 2010

(30) Foreign Application Priority Data

Jul. 25, 2008   (EP) .................................. 08290727

(51) Int. Cl.
 *G06F 11/00*   (2006.01)
(52) U.S. Cl. ........................................................ 714/15
(58) Field of Classification Search ...................... 714/15
 See application file for complete search history.

(56) References Cited

U.S. PATENT DOCUMENTS

| | | | |
|---|---|---|---|
| 5,027,269 A * | 6/1991 | Grant et al. .................... | 709/224 |
| 6,490,610 B1 | 12/2002 | Rizvi et al. | |
| 7,206,826 B1 * | 4/2007 | Parker et al. ................... | 709/220 |
| 2007/0239798 A1 * | 10/2007 | Shringi et al. ................ | 707/201 |

OTHER PUBLICATIONS

FairCom c-tree Plus V9 Programmers Reference Guide, Jun. 27, 2008.*

Microsoft SQL Server 2005 (msdn.microsoft.com/en-us/library/ms188317(v=SQL.90).aspx).*

"TR-069 CPE WAN Management Protocol v1.1 Issue 1 Amentment 2" Broadband Forum Technical Report, No. 1 Amendment 2, Dec. 1, 2007, pp. 1-138.

* cited by examiner

*Primary Examiner* — Robert Beausoliel, Jr.
*Assistant Examiner* — Neil Miles
(74) *Attorney, Agent, or Firm* — Harness, Dickey & Pierce, P.L.C.

(57) ABSTRACT

A method for improving the security of actions performed by Remote Procedure Calls RPC invoked during a TR-069 Remote Management Protocol session between an Auto-Configuration Server ACS and a Customer Premises Equipment CPE of a DSL telecommunication system. The TR-069 session comprises several RPC's executing actions on parameters of an object model and the method comprises the steps of
 starting a TR-069 session wherein RPC's are invoked;
 opening a transactional TR-069 session or transaction whereby parameters of the object model handled by RPC's are protected through a SavePoint mechanism;
 closing the transaction by the ACS; and either:
 committing the transaction via a StoreSavePoint RPC invoked by the ACS, or
 rolling-back actions of RPC's via a RestoreSavePoint RPC also invoked by the ACS.
If the transaction is not committed during a first TR-069 session, the CPE sends an Inform with an event code Open-SavePoint to the ACS during a next TR-069 session and the ACS may reply by including an additional field in the Inform-Response to close the transaction. The SavePoint mechanism saves parameter values of the object model prior to any RPC by storing these parameter values at the CPE-side. The Save-Point mechanism may also save a history of the RPC's invoked during the transaction.

12 Claims, 2 Drawing Sheets

TR-069 SAVEPOINTS

The present invention relates to a method for improving the security of actions performed by Remote Procedure Calls RPC invoked during a TR-069 Remote Management Protocol session between an Auto-Configuration Server ACS and a Customer Premises Equipment CPE of a DSL telecommunication system, said TR-069 session comprising a plurality of said Remote Procedure Calls executing actions on parameters of an object model.

Such a method is already known in the art. The TR-069 Remote Management Protocol consists of an object-model on which Remote Procedure Calls RPC's are invoked.

The Remote Management Protocol is a CPE WAN management Protocol CWMP defined by the DSL forum's Technical Report TR-069 for secure auto-configuration as well as other CPE management functions. In other words, TR-069 is a protocol for communication between a CPE and Auto-Configuration Server ACS that encompasses secure auto-configuration as well as other CPE management functions within a common framework. The Technical report TR-069 and its amendments are for instance published on the Internet at:

<http:///www.broadband-forum.org/technical/trlist.php>.

Remote Procedure Calls RPC's are executed as atomic actions, i.e. either the RPC succeeds and the action takes completely effect, either the RPC fails and eventual partial changes are undone until the point the RPC was executed. For instance, SetParameterValues, SetParameterAttributes, AddObject, etc. will not affect the object model in case an error occurred during the execution of the RPC.

While RPC atomicity protects changes that occur on individual RPC-level, there is no similar approach provided on session-level. However, such session-scope atomicity might be necessary as described in following examples:

some changes in parameter values may interrupt the connectivity with the ACS in an irreversible way. The consequence is that the CPE gets bricked, e.g. by putting an unreachable ACS URL or wrong ACS credentials in the InternetGatewayDevice.ManagementServer object;

an Open service Gateway Initiative OSGi bundle (especially in the case native code is provided) that brings the service platform in an unstable state (e.g. high CPU-load, out of memory or connection break-down) because it is not suitable for the platform or running software;

wrong or unadapted DSL configuration, IP routing, firewall parameters, etc. . . .

In those cases, all RPC's were performed with success, but the session on itself was not validated.

The best existing solution is to provide some security through software/hardware watchdog timers. The purpose of a watchdog timer is to reboot the complete platform in case instabilities were detected (traditionally caused by CPU or kernel overload), with the hope that it will solve the issues the platform experienced.

However, in the present case, the classical watchdog mechanism fails. The CPE gets bricked because wrong configuration parameters were dumped. A reboot would not solve the problem because the offending changes have been implicitly committed during the last TR-069 Remote Management Protocol session, and no rollback mechanism is foreseen in the TR-069 protocol nor a feedback link between TR-069 and the watchdog timer.

An object of the present invention is to provide a method of the above known type but for improving the security of actions invoked during a TR-069 Remote Management Protocol session.

According to the invention, this object is achieved due to the fact that said method comprises the steps of starting a TR-069 Remote Management Protocol session wherein Remote Procedure Calls are invoked;

opening a transactional TR-069 session whereby parameters of said object model handled by Remote Procedure Calls are protected through a SavePoint mechanism;

closing said transactional TR-069 session by said Auto-Configuration Server ACS;

and that said method further comprises the step of either committing said transactional TR-069 session via a StoreSavePoint RPC invoked by said Auto-Configuration Server, or rolling-back actions of Remote Procedure Calls via a RestoreSavePoint RPC invoked by said Auto-Configuration Server.

In this way, if the RPC's succeed and the action takes completely effect, the StoreSavePoint RPC invoked by the ACS commits the changes and commands the CPE to close the transactional TR-069 session, hereafter also merely called transaction. All changes are then kept persistent.

On the other hand, if the RPC's fail, the RestoreSavePoint RPC invoked by the ACS requests the CPE to roll-back to a state previously saved by the SavePoint mechanism. All changes are then undone.

As a result, the CPE is prevented of being bricked or locked down during TR-069 Remote Management Protocol session.

Another characterizing embodiment of the present invention is that said transactional TR-069 session is implicitly opened at the start of said TR-069 Remote Management Protocol session.

In this case, the transactional TR-069 session is opened implicitly when the first Remote Procedure Call RPC of a TR-069 Remote Management Protocol session is invoked on the Customer Premises Equipment CPE. This means that from that moment on, every TR-069 session is transactional.

Also another characterizing embodiment of the present invention is that said transactional TR-069 session is explicitly opened by a StartRecording RPC invoked by said Auto-Configuration Server ACS.

This is a more flexible approach than the implicit opening at the start of the TR-069 session. The Auto-Configuration Server ACS informs the Customer Premises Equipment CPE to open a transactional TR-069 session because the actions or changes that will be performed during the TR-069 session may be harmful.

Yet another characterizing embodiment of the present invention is that said transactional TR-069 session is committed by a Normal SavePoint Commit RPC invoked by said Auto-Configuration Server ACS either during said TR-069 Remote Management Protocol session or during a subsequent TR-069 Remote Management Protocol session.

In this way, the transactional TR-069 session or transaction is committed during the established TR-069 Remote Management Protocol session or, when the transaction was not committed explicitly in the running TR-069 session, it must be committed in a subsequent TR-069 session.

In a variant characterizing embodiment of the present invention, said transactional TR-069 session is committed via a Timed SavePoint Commit RPC invoked by said Auto-Configuration Server ACS, and said Timed SavePoint Commit RPC fixes a delay between the established and a subsequent TR-069 Remote Management Protocol session.

In order to secure the Customer Premises Equipment CPE from lockouts, the next TR-069 session can be scheduled after a given period of time determined by the Timed SavePoint Commit RPC.

In a preferred characterizing embodiment of the present invention, said Auto-Configuration Server ACS invokes a plurality of Timed SavePoint Commits RPC's during a same transactional TR-069 session, and each successive Timed SavePoint Commit RPC fixes a delay that is shorter than the delay fixed by the preceding Timed SavePoint Commit RPC in said plurality.

This system of nested SavePoints allows partial restores.

Also another characterizing embodiment of the present invention is that when said transactional TR-069 session is not committed during a first TR-069 Remote Management Protocol session, said Customer Premises Equipment CPE sends an Inform with an event code OpenSavePoint to said Auto-Configuration Server ACS during a next TR-069 Remote Management Protocol session, and that said Auto-Configuration Server ACS includes an additional field in the InformResponse to close the transactional TR-069 session and to commit said first TR-069 Remote Management Protocol session.

When the transaction was not explicitly committed in the running TR-069 session, it must be committed in the next TR-069 session. In this case, the CPE sends an Inform with a new event code OpenSavePoint in order to remind the ACS that a transaction with changes waits to get committed. The ACS then includes an additional field in the InformResponse in order to close the transaction and to commit the previous TR-069 session.

It is to be noted that the ACS can trigger the CPE to establish a session via a ConnectionRequest. In this case, the CPE should also send an OpenSavePoint eventcode in the Inform message.

Still another characterizing embodiment of the present invention is that said SavePoint mechanism saves parameter values of said object model handled prior to any Remote Procedure Call.

In this way, if the transaction is not committed by a StoreSavePoint RPC, the CPE should restore its state to the last committed SavePoint.

Yet another characterizing embodiment of the present invention is that said SavePoint mechanism saves said parameter values by storing said parameter values at the Customer Premises Equipment CPE of said DSL telecommunication system This offloads the server from storing changes for each CPE and to support relatively complex rollback scenarios.

Further characterizing embodiments of the present method are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
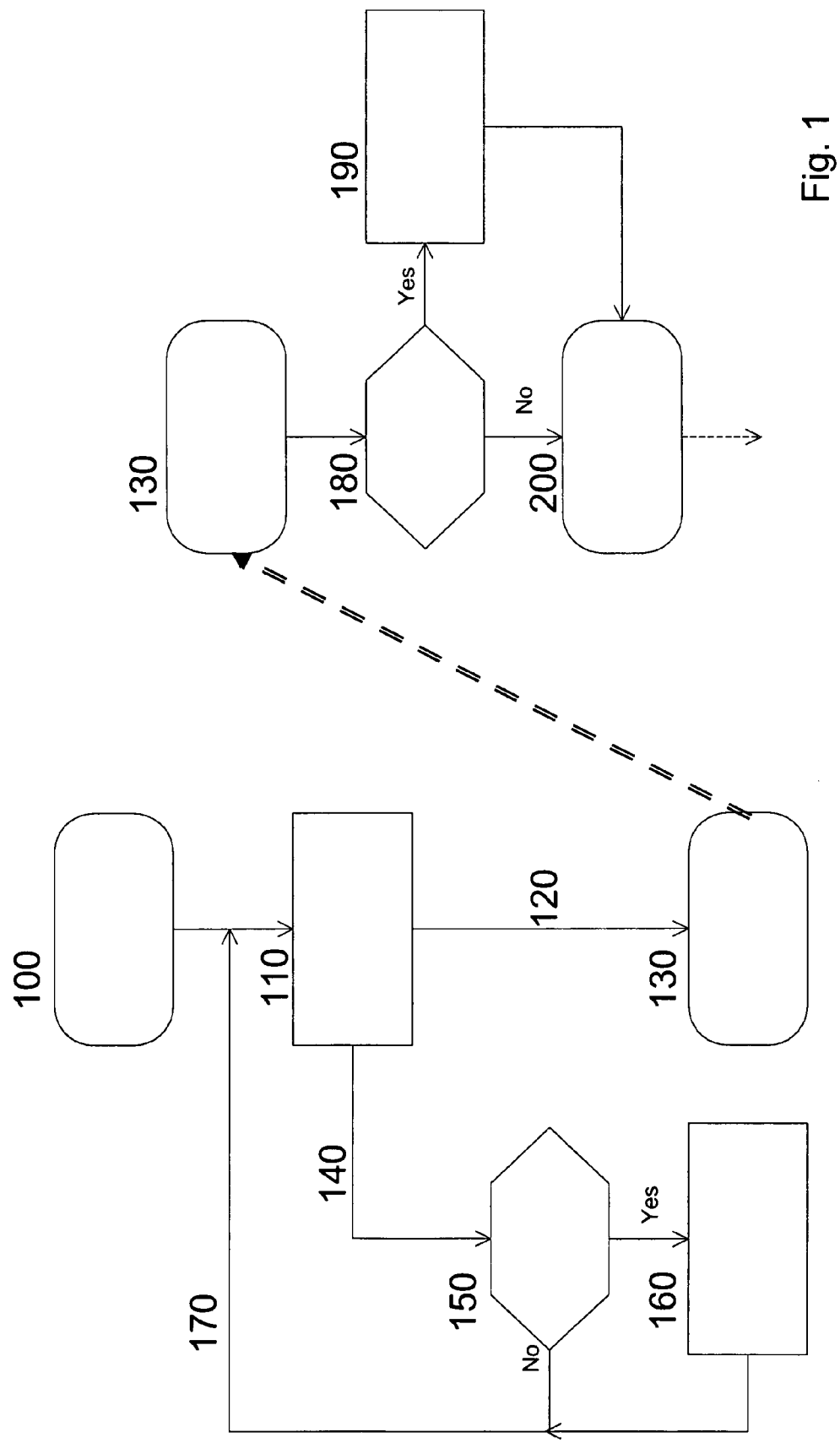
FIG. 1 represents a method for improving, according to the invention, the security of actions performed by RPC Calls invoked during a TR-069 session.

The method shown at FIG. 1 is used for improving the security of actions performed by Remote Procedure Calls RPC invoked during a TR-069 Remote Management Protocol session, hereafter merely called TR-069 session, between an Auto-Configuration Server ACS and a Customer Premises Equipment CPE of a DSL telecommunication system. The TR-069 session comprises several Remote Procedure Calls RPC's executing actions on parameters of an object model.

Remote Procedure Calls RPC's are executed as atomic actions, i.e. either the RPC succeeds and the action takes completely effect, either the RPC fails and eventual partial changes are undone until the point the RPC was executed. For instance, SetParameterValues, SetParameterAttributes, AddObject, etc. will not affect the object model in case an error occurred during the execution of the RPC.

While RPC atomicity protects changes that occur on individual RPC-level, the present invention provides a similar approach on session-level, because in some cases all RPC's may be performed with success, but the session on itself may not be validated.

The basic idea for improving the security of actions invoked during a TR-069 session is to introduce TR-069 'SavePoints'. TR-069 SavePoints can be best described as being snapshots taken at some point in time where the TR-69 object model is considered being stable.

TR-069 SavePoints have the following characteristics:
They are preferably stored at the CPE-side, generally on demand of the ACS, but in some cases it may be interesting that the CPE takes the initiative if the ACS didn't, e.g. in case of change in the ACS URL;
SavePoints can be set at the beginning, during or at the end of a TR-069 session, or between one or more than one TR-069 session;
Restoring to a previous SavePoint can comprise an overwrite of changed parameter values and attributes, and/or the execution of undo operations, e.g. RPC rollback for downloads which is an 'unload'.
Moreover, TR-069 SavePoints can be used to:
Make backups of the current state (e.g. object model) of the CPE;
In order to offload the CPE from storing SavePoints, they can be uploaded to a remote fileserver, and downloaded back to the CPE at a later time;
Dump configuration profiles, which comprises to set a large collection of parameters in one go. Using the standard SetParameterValue approach would take too long or would consume too much processing or bandwidth. A variant of this approach might be to select a pre-provisioned OEM-like profile on the CPE (shipped at manufacturing time), via a SavePoint which executes configuration actions.

Finally, restoring to a previous SavePoint or accepting a new SavePoint should be further supported by a lightweight transaction mechanism, supporting explicit transaction commitments or timer-supervised commitments. Timed commits make it possible to the CPE to rollback to a stable SavePoint in case the connection to the ACS was lost due to the changes.

In more detail, the TR-069 SavePoint handling is supported by a lightweight transaction mechanism that operates as follows; the labels between square brackets making reference to like-named labels at FIG. 1.

First, a transactional TR-069 session, hereafter merely called transaction, is opened [100] whereby parameters of the object model handled by Remote Procedure Calls RPC's are protected through a SavePoint mechanism.

The Auto-Configuration Server ACS then invokes [110] RPC's on the Customer Premises Equipment CPE side.

On the one hand, when the ACS has finished [120] to invoke RPC's, it is proceeded [130] with the TR-069 Transactional Session.

On the other hand, if the RPC's fail [140], the ACS decides [150] to rollback to a prior stable state [Yes] of not [No].

If the ACS decides to rollback to a prior stable state [Yes], this ACS invokes [160] a RestoreSavePoint RPC. The RestoreSavePoint RPC invoked by the ACS requests the CPE to rollback to a state previously saved by the SavePoint mechanism. All changes are then undone and the process is then returned [170] to the RPC's invoked by the ACS at status [110].

If the ACS decides not rolling back [No], The process is immediately returned [170] to the RPC's invoked by the ACS at status [110].

The proceed [130] with the transaction is completed by a decision [180] of the ACS to commit [Yes] or not [No] the changes at that stage.

If the RPC's succeed, the ACS decides to commit [Yes] the changes and invokes [190] a StoreSavePoint RPC. The action then takes completely effect, the StoreSavePoint RPC invoked by the ACS commits the changes and commands the CPE to close the transactional TR-069 session. All changes are then kept persistent. The TR-069 session is then also terminated [200].

If the ACS decides to not commit [No] the changes, the TR-069 session is immediately terminated [200].

It is to be noted that, in case the SavePoint was not stored in the established or current TR-069 session, it must be stored in the next session.

By this SavePoint mechanism, wherein the CPE is prevented of being bricked or locked down during TR-069 session, two new RPC's are introduced:
 a StoreSavePoint RPC: when the ACS commits the changes and commands the CPE to close the transaction: all changes are kept persistent; and
 a RestoreSavePoint RPC: when the ACS requests the CPE to roll-back to the last stored SavePoint: all changes are undone.

Figure 2:
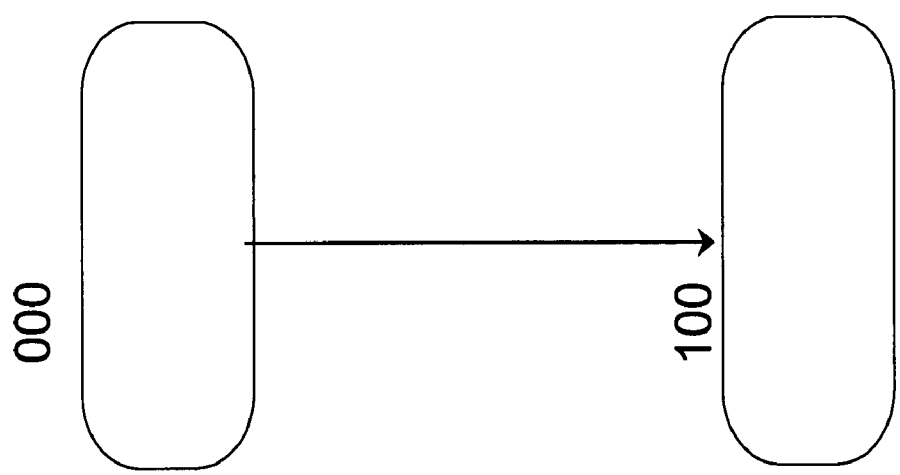
FIG. 2 represents a particular step of the method of FIG. 1.

In a basic implementation, shown at FIG. 2, of the TR-069 SavePoint handling, the transactional TR-069 session [100] is implicitly opened at the start [000] of the TR-069 session, i.e. when the first RPC is invoked on the CPE. This means that from now on, every TR-069 session is transactional.

Figure 3:
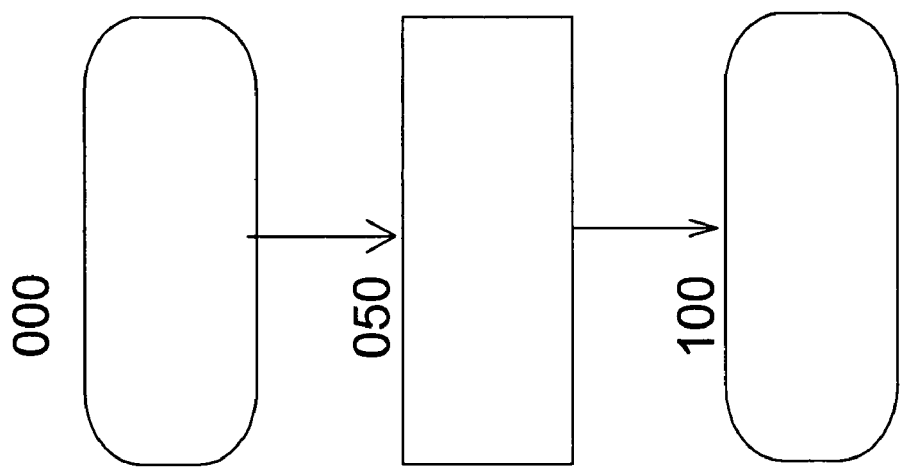
FIG. 3 represents a variant of the particular step shown at FIG. 2.

However, because it is not always desired to open the transaction together with the TR-069 Remote Management Protocol session, a more flexible approach, shown at FIG. 3, with explicit transaction marking is preferably used. Therein, the ACS informs the CPE to open [050] a transaction because the changes that will be performed may be harmful. In more detail, the transactional TR-069 session is then explicitly opened [050] by a StartRecording RPC invoked by the Auto-Configuration Server ACS.

Two types of commits can be implemented:
 a Normal SavePoint commit: this is the commit type as described above with respect to the implicit and explicit opening of a transaction invoked by the ACS. In this case, the SavePoint can be committed either in the established session or, if the transaction was not committed explicitly in the running TR-069 session, when the next session is established; and
 a Timed SavePoint commit: in order to secure the CPE from lockouts, the next TR-069 session can be scheduled as immediate, or after a given period of time. The Timed SavePoint Commit RPC is invoked by the ACS and fixes a delay between the established TR-069 session and the next TR-069 session. In other words, the next TR-069 session is scheduled after a given period of time which is the delay determined by the Timed SavePoint Commit RPC. This prevents the CPE from lockouts.

Preferably, the Auto-Configuration Server ACS invokes several Timed SavePoint Commits RPC's during a same transaction. Each of these successive or nested Timed SavePoint Commit RPC then fixes a delay that is shorter than the delay fixed by the preceding Timed SavePoint Commit RPC. This system of nested SavePoints allows partial restores and facilitates the detection of failures.

The SavePoint mechanism saves parameter values of the object model handled prior to any Remote Procedure Call RPC. As a result, if the transaction is not committed by a StoreSavePoint RPC, a failure is suspected and the CPE should restore its state to the last committed SavePoint.

More generally, when the transaction was not committed explicitly in the running TR-069 session, it must be committed in the next TR-069 session.

This can for instance be achieved by one of the following Out-Of-Session Transaction Commit Delivery Mechanisms.

When the transactional TR-069 session is not committed during a first TR-069 Remote Management Protocol session, the Customer Premises Equipment CPE sends an Inform with an event code, e.g. OpenSavePoint to the Auto-Configuration Server ACS during the next TR-069 session in order to remind the ACS that a transaction with changes waits to get committed. The ACS can then reply by including an additional field in the InformResponse in order to close the transaction and to commit the SavePoint and, by the way, the first TR-069 session.

The ACS can also decide to explicitly commit, via a StoreSavePoint RPC, or after evaluation to rollback via a RestoreSavePoint RPC.

Perhaps not all parameters of the object model need to be protected through a SavePoint. In this latter case, it is possible to define a new parameter attribute, e.g. named Transactional or SavePoint. Only parameters whose attribute is marked as Transactional or SavePoint should be considered in this fine-grained selection.

SavePoints must be stored on the CPE-side. The most obvious way is to create a file per SavePoint on the file system that contains the parameter values, attributes, etc.

It is also possible to upload those files to a remote fileserver, for backup/restore purposes, or when the CPE runs out of space on the file system.

Finally, the SavePoint mechanism can save, on the CPE-side, a history of Remote Procedure Calls invoked during the transactional TR-069 session in order to be able to restore the parameters if needed.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for improving the security of actions performed by Remote Procedure Calls (RPC) invoked during a TR-069 Remote Management Protocol session between an Auto-Configuration Server (ACS) and a Customer Premises Equipment (CPE) of a DSL telecommunication system, said TR-069 session including a plurality of said RPCs executing actions on parameters of an object model, the method comprising:
   starting a TR-069 Remote Management Protocol session invoking RPCs;
   opening a transactional TR-069 session such that parameters of said object model handled by RPCs are protected through a SavePoint mechanism;
   closing said transactional TR-069 session by said ACS;
   committing said transactional TR-069 session via a StoreSavePoint RPC invoked by said ACS if the RPCs succeed; and
   rolling-back actions of RPCs via a RestoreSavePoint RPC invoked by said ACS if the RPCs fail.

2. The method of claim 1, wherein said transactional TR-069 session is implicitly opened at the start of said TR-069 Remote Management Protocol session.

3. The method of claim 1, wherein said transactional TR-069 session is explicitly opened by a StartRecording RPC invoked by said ACS.

4. The method of claim 2, wherein said transactional TR-069 session is committed by a Normal SavePoint Commit RPC invoked by said ACS.

5. The method of claim 4, wherein said transactional TR-069 session is committed by said Normal SavePoint Commit RPC invoked during said TR-069 Remote Management Protocol session.

6. The method of claim 3, wherein said transactional TR-069 session is committed by said Normal SavePoint Commit RPC invoked during a subsequent TR-069 Remote Management Protocol session.

7. The method of claim 2, wherein,
   said transactional TR-069 session is committed via a Timed SavePoint Commit RPC invoked by said ACS, and
   said Timed SavePoint Commit RPC fixes a delay between the established and a subsequent TR-069 Remote Management Protocol session.

8. The method of claim 7, wherein,
   said ACS invokes a plurality of Timed SavePoint Commits RPC's during a same transactional TR-069 session, and
   each successive Timed SavePoint Commit RPC fixes a delay that is shorter than the delay fixed by the preceding Timed SavePoint Commit RPC in said plurality.

9. The method of claim 6, wherein
   when said transactional TR-069 session is not committed during a first TR-069 Remote Management Protocol session, said CPE sends an Inform with an event code OpenSavePoint to said ACS during a next TR-069 Remote Management Protocol session, and
   said ACS includes an additional field in an InformResponse RPC to close the transactional TR-069 session and to commit said first TR-069 Remote Management Protocol session.

10. The method of claim 1, wherein said SavePoint mechanism saves parameter values of said object model handled prior to any RPC.

11. The method of claim 10, wherein said SavePoint mechanism saves said parameter values by storing said parameter values at the CPE of said DSL telecommunication system.

12. The method of claim 1, wherein said SavePoint mechanism saves a history of RPCs invoked during said transactional TR-069 session.

\* \* \* \* \*